United States Patent [19]
Bourne et al.

[11] Patent Number: 5,131,458
[45] Date of Patent: Jul. 21, 1992

[54] MODULAR BACK SIDE RADIANT HEATING PANELS WITH SPRING RETENTION DEVICES

[75] Inventors: Richard C. Bourne; David A. Springer, both of Davis, Calif.

[73] Assignee: Davis Energy Group, Inc., Davis, Calif.

[21] Appl. No.: 674,191

[22] Filed: Mar. 25, 1991

[51] Int. Cl.$^5$ .......................... F24D 3/00; F24H 9/06
[52] U.S. Cl. ...................................... 165/56; 165/49; 165/76; 165/136; 237/69; 52/309.4; 52/406; 52/407
[58] Field of Search ................. 165/49, 56, 135, 136, 165/76; 52/406, 407, 806, 808, 809, 309.4; 237/69

[56] References Cited

U.S. PATENT DOCUMENTS

| | | | |
|---|---|---|---|
| 1,767,168 | 6/1930 | Burt, Jr. | 52/406 |
| 1,957,822 | 5/1934 | Denning | 52/406 |
| 2,039,601 | 5/1936 | London | 52/806 |
| 2,313,345 | 3/1943 | Jones | 52/406 |
| 2,548,036 | 9/1946 | Milborn | 165/56 |
| 3,231,944 | 2/1966 | Bennett | 52/406 |
| 3,561,177 | 2/1971 | Agro et al. | 52/309.4 |
| 4,375,741 | 3/1983 | Paliwoda | 52/407 |
| 4,423,580 | 1/1984 | Dyan | 52/407 |
| 4,426,818 | 1/1984 | Hoffman | 52/309.4 |
| 4,646,814 | 3/1987 | Fennesz | 165/56 |
| 4,686,806 | 8/1987 | Bennett | 52/309.4 |
| 4,728,889 | 11/1988 | Bourne | 165/56 |
| 4,807,411 | 2/1989 | Capaul | 52/806 |
| 4,889,758 | 12/1989 | Rinkewich | 52/808 |

FOREIGN PATENT DOCUMENTS

| | | | |
|---|---|---|---|
| 659866 | 3/1963 | Canada . | |
| 676751 | 12/1963 | Canada . | |
| 22646 | 1/1981 | European Pat. Off. | 165/56 |
| 29818 | 6/1981 | European Pat. Off. | 165/49 |
| 133631 | 3/1985 | European Pat. Off. | 165/56 |
| 2650160 | 5/1978 | Fed. Rep. of Germany | 165/56 |
| 2850669 | 5/1979 | Fed. Rep. of Germany | 165/49 |
| 3114304 | 11/1982 | Fed. Rep. of Germany | 165/56 |
| 52-9951 | 1/1977 | Japan | 165/49 |
| 0070329 | 4/1982 | Japan | 165/56 |
| 57-70330 | 4/1982 | Japan . | |
| 0070331 | 4/1982 | Japan | 165/56 |
| 0225228 | 12/1984 | Japan | 165/56 |
| 0225229 | 12/1984 | Japan | 165/56 |
| WO83/01992 | 6/1983 | PCT Int'l Appl. | 165/56 |
| 587457 | 4/1977 | Switzerland . | |
| 82/01058 | 4/1982 | World Int. Prop. O. . | |

OTHER PUBLICATIONS

Wirsbo Under Floor Heating Installation Manual, Wirsbo Bruks Aktiebolag, Sweden, (no date).
Product Brochure, "Infloor Heating Systems", In--Floor Heat Systems, P.O. Box 253 Hamel, Minn. (1988).
Product Brochure, "Radiant Roll", Bio-Energy Systems, Inc. P.O. Box 191 Ellenville, N.Y. (1988).
H. H. Robertson Co. v. H. H. Barger Metal Fabricating Co. 225 (USPQ 1191-1211, decided Nov. 20, 1984.

*Primary Examiner*—John K. Ford
*Attorney, Agent, or Firm*—Oliff & Berridge

[57] ABSTRACT

A modular temperature controlling panel for location adjacent a rear side of a room surface and between spaced penetrable structural framing members for supporting the room surface includes: an insulating core having a contact surface for location adjacent the room surface and a non-contact surface opposite the room surface; a linear thermal source recessed within the core on the contact surface; a metallic sheet on the contact surface of the core for contacting the linear thermal source; and a spring retention device on the non-contact surface of the core for securing the core between the spaced framing members and for urging the contact surface towards the room surface. The spring retention device is rotatable about a rotation axis perpendicular to the framing members between a loaded position for confining the spring retention device within the core and a secured position for biasing the spring retention device to penetrate the spaced framing members and urge the contact face of the core towards the room surface.

19 Claims, 8 Drawing Sheets

POSITION 1

POSITION 2

MODULAR BACK SIDE RADIANT HEATING PANELS WITH SPRING RETENTION DEVICES

BACKGROUND OF THE INVENTION

1. Field of the Invention

The present invention relates to radiant heating and cooling systems, and, more specifically, to modular panel radiant heating systems for heating a room by either circulating a liquid through tubing, or applying voltage to electrical heating cables contained in heat transfer panels secured to the rear side of floor, wall, or ceiling surfaces. Room cooling may, with some restrictions, also be accomplished by circulating a chilled liquid through tubing in the panels.

2. Discussion of Related Art

Radiant systems for room heating have been in use for nearly 80 years. Many such systems circulate hot water through metal or plastic tubing embedded in concrete or plaster surface materials. However, plaster is now less frequently used, and concrete floors are less popular than raised wood-framed floors in many climate areas with substantial heating loads. With raised wood-framed floors, radiant heating is presently at a disadvantage compared to forced-air heating systems when considering the cost of a concrete floor topping to surround the tubes. Also, radiant heating systems are expensive to retrofit to existing buildings because adding the weight and thickness of a concrete topping can require costly alterations such as strengthening the floor structure, shortening doors, and moving baseboards. Electric radiant heating systems have usually been placed in ceilings, and have lost popularity due to high operating costs.

One attractive option for reducing the cost of new and retrofit hydronic radiant heating systems for use with wood-framed floor, wall, and ceiling assemblies is to secure lightweight tubing or hydronic panel assemblies in thermal contact with the rear sides of surface panel materials supported by the wood framing members. Various concepts and apparatus for such systems may be found in the prior art. A rubber "tubemat" product is produced and comprises multiple small tubes joined in a flat panel which may be stapled or otherwise secured to a surface. However, this configuration is expensive, fails to provide adequate lateral heat-spreading from the tubes, cannot easily provide reliable contact with the room surface, and requires additional labor for placing insulation to limit heat losses from the rear side of the tubemat.

An early prefabricated modular panel is shown in U.S. Pat. No. 2,548,036 comprising a double metal sheet with integral serpentine tubing pattern and surface deformations to improve bonding to a plaster surface. European Patent WO 82/01058 shows a lightweight assembly more appropriate for installation against current "dry" surface panels; the assembly comprises a metal surface sheet with grooves holding heat exchange tubes placed parallel to the wood supporting frame and a foam insulation backing. The semi-flexible assembly is arched to maintain contact with the back surface after installation. The metal sheet is designed to spread heat laterally from the tubes and extends between wood framing and surface panel to secure the assembly in place. However, this fastening configuration prevents installation after placement of the interior surface material.

Other designs in the prior art provide modular panel assemblies including water passages, a metal heat-spreading surface, and plastic or other insulation backing from which the assemblies derive their rigidity. However, the prior art systems do not include components facilitating rapid installation in retrofit applications, nor do they provide fastening systems which are likely to maintain positive contact with the room surface over a long period of time. The prior art systems do not provide panel designs with rigid insulation shaped to maximize thermal and structural performance of the insulation material. Prior art systems also fail to maximize heat transfer in locations where surface irregularities prevent contact.

SUMMARY OF THE INVENTION

It is an object of the invention to provide a lightweight, modular radiant panel system which maintains close contact with the rear side of a floor, wall, or ceiling surface.

A further object is to provide a radiant panel system which maintains effective radiant heat transfer with the rear side of a room surface in locations where physical contact does not occur.

A further object is to provide a radiant panel system which minimizes heat losses through its rear side (opposite the room surface).

A further object is to provide a rapid panel securement system which does not require fastening via screws, nails, staples, or glue to the room surface panel.

A further object is to provide a system of modular panels for placement between wood framing members, designed to minimize the time and difficulty of securing and interconnecting panels.

These and other objects are achieved by the back side modular radiant panel systems of the present invention, comprising insulating panels containing heat source strips (either tubing or cable) in contact with metal surface sheets which spread heat laterally and then inwardly through the room surface material. The panels are secured against the rear side of the room surface material by spring force from bent metal bars whose sharp ends project into adjacent wood framing members. Since the back side of the room surface may be rough, preventing full panel contact, the metal surface sheet is coated with a surface, preferably black paint, to maximize radiant heat transfer where contact does not occur. Of the two heat source connection ends projecting from the panel, one is longer to project through or around the framing member for connection to the short projecting end of an adjacent panel.

BRIEF DESCRIPTION OF THE DRAWINGS

Other objects, features and advantages of the present invention will become more apparent from the following detailed description of the various embodiments taken in conjunction with the accompanying drawings, in which.

DETAILED DESCRIPTION OF THE PREFERRED EMBODIMENTS

Figure 1:
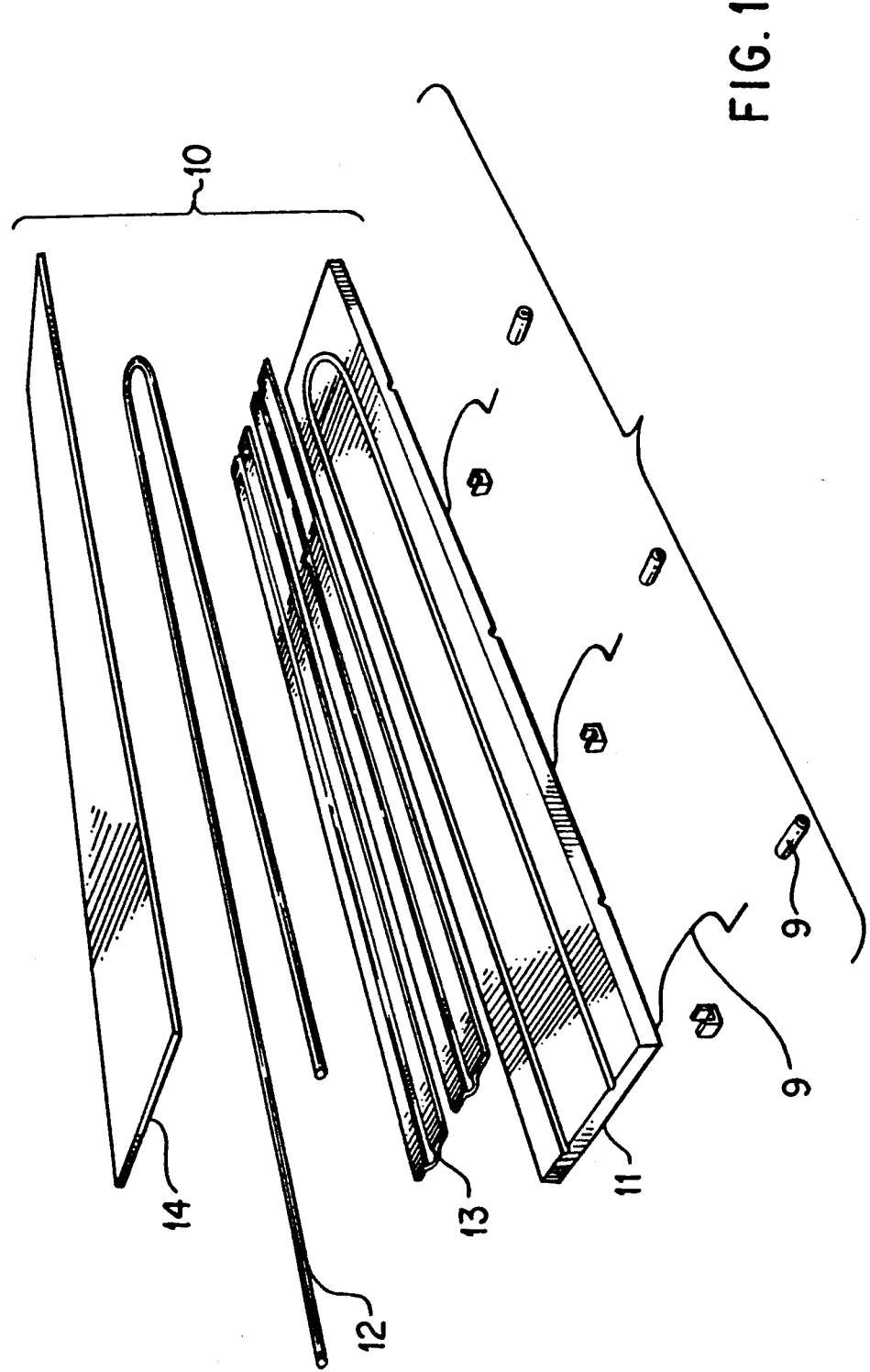
FIG. 1 is an exploded view of a modular radiant heating panel according to the present invention.

The basic configuration of the inventive modular panel concept can be better understood with reference to FIG. 1, which shows an exploded view of a modular panel 10 according to the present invention. The panel 10 includes a rigid insulating core 11, optional, but preferred heat spreading fins 13, a linear thermal source 12, metallic sheet 14, and spring retention means 9, each of which is discussed below in detail. As illustrated in FIG. 1, the 10 metallic sheet 14 may be coated, preferably with black paint, to maximize radiant heat transfer.

Figure 2:
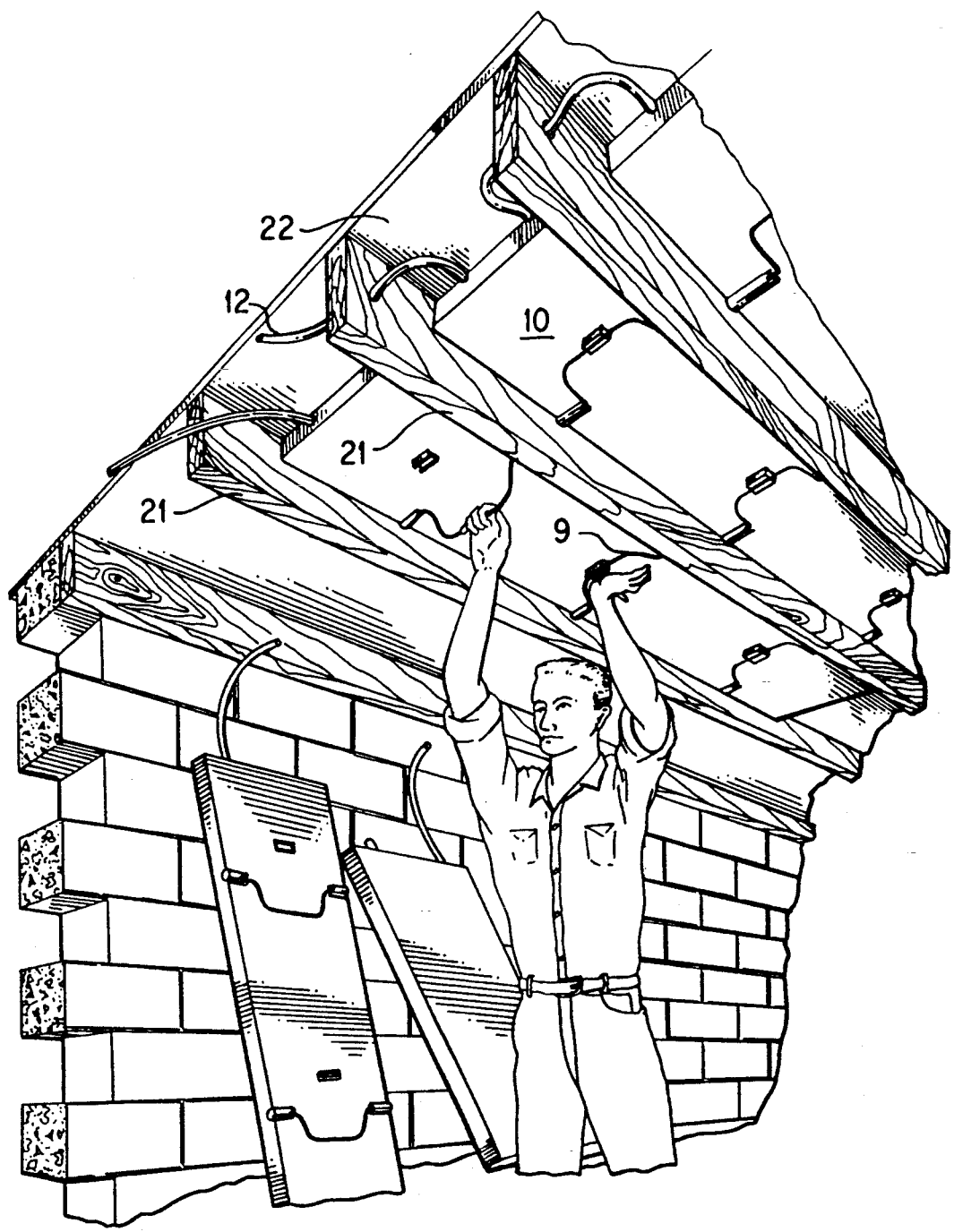
FIG. 2 is a perspective view showing an installation of the panel in FIG. 1.

Basic installation of the modular panels can be better understood with reference to FIG. 2. Modular panels 10 are placed between ceiling members 21 and in contact with a rear side of a room surface defined by surface material 22. Spring retention means 9 are rapidly and easily manually manipulated from a "loaded" position (FIG. 4a) to a "secured" position (FIG. 4b) to provide secure installation. In FIG. 2, the installer's left hand has just moved a spring retention means to the "secured" position while the right hand is manipulating a spring retention means through an intermediate rotating position, eventually ending up in the "secured" position shown in FIG. 4b. Thermal source ends 12 may be easily connected to adjacent source ends to form a continuous thermal source loop through the panels. The present invention will be described in even further detail below.

Figure 3:
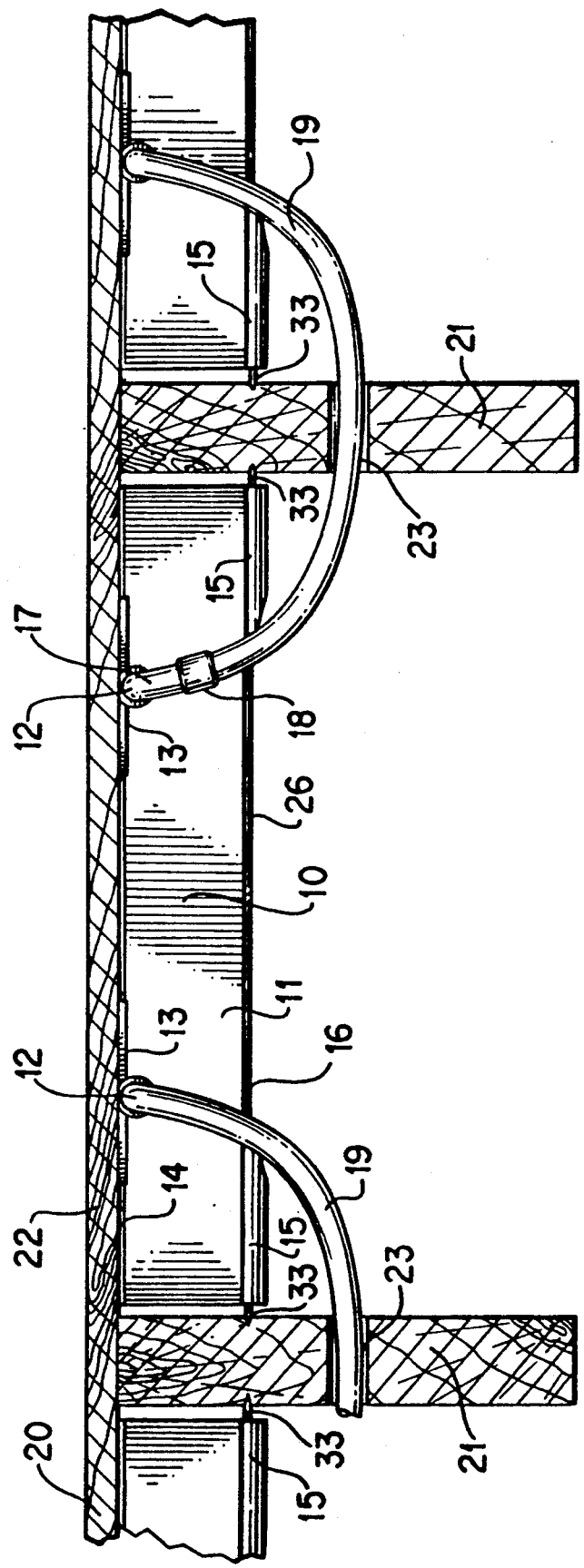
FIG. 3 is a cross-sectional view through one modular radiant heating panel embodiment according to the present invention located between two wood structural members, making contact with the rear side of a room enclosing surface.

The basic function and configuration of the modular panel concept may be understood by reference to FIG. 3, which shows in cross-sectional view a preferred embodiment of the invention installed between two wood structural members 21 with its "contact" side held firmly against the rear side 20 of a room surface panel 22 secured to the structural members 21. Portions of adjacent panels are also shown to illustrate the connection method between panels. For tolerance, the modular panel 10 is approximately ⅛" narrower than the nominal spacing between wood framing members 21. For example, panel width is 14" for typical 1.5" wide framing members placed on 16" centers. Length of panel 10 typically varies in length increments of 2' from a minimum of 4' to a maximum of 12'. Members 21 may provide structural strength for either floor, wall, or ceiling interior surface material 22 secured thereto. Surface material 22 is typically plywood for floors and gypsum board for walls and ceilings.

Strength and rigidity of panel 10 results from its core of lightweight rigid insulation board 11. While several alternate rigid foam materials are available, one desirable insulation board uses an isocyanurate rigid foam core surfaced with aluminum foil on its two major surfaces (edges are exposed isocyanurate). Back aluminum foil surface 26 on the rear (non-contact) surface is highly reflective (emissivity 0.05 or less) to minimize radiant heat transfer.

Board 11, which provides strength and rigidity as well as insulating against heat loss through the rear (non-contact) side of the panel, is cut with longitudinal grooves to hold water-carrying tubes 12. The tubes are connected to a source (not shown) for heating or cooling the water and recirculating the water through the tubes. Alternately, electric heating cables may be used in smaller or narrower grooves, the cables being connected to an electric source (not shown). The groove will typically make a semi-circular turn at one longitudinal end of the panel allowing both ends of the heating tube 12 or alternate cable to enter at the same opposite longitudinal panel end (opposite a "return" bend, as shown with reference to FIG. 1).

Of the two tube or cable ends, longer "tails" 19 of one panel 10 extend through holes 23 in members 21 for attachment to connection fittings 18 preattached to shorter tails 17 of an adjacent panel.

Panel lateral heat transfer from the tube 12 is enhanced by metal heat spreading fins 13, preferably made of aluminum for cost-effective heat transfer. Fins 13 are contoured to fit between tube 12 and insulating board 11 to conduct heat from the back tube surfaces (i.e., surfaces in contact with the grooves in board 11) laterally across the panel. Surface aluminum heat transfer sheet 14 also spreads heat laterally as the contact surface of the panel, and is adhered both to tubes 12 and heat spreading fins 13. For economy, fins 13 may cover only portions of the panel width near the tubes, or may be omitted entirely.

The modulator panel embodiment of FIG. 1 is held by spring force from the spring retention means 9 against the rear side 20 of room surface material 22 by spring bars 16 with pointed ends 33 sprung into framing members 21. Spring bars 16 are located approximately every 2' along the panel length, and operate through guide tubes 15 as further described in conjunction with FIGS. 4–7.

Figure 4A:
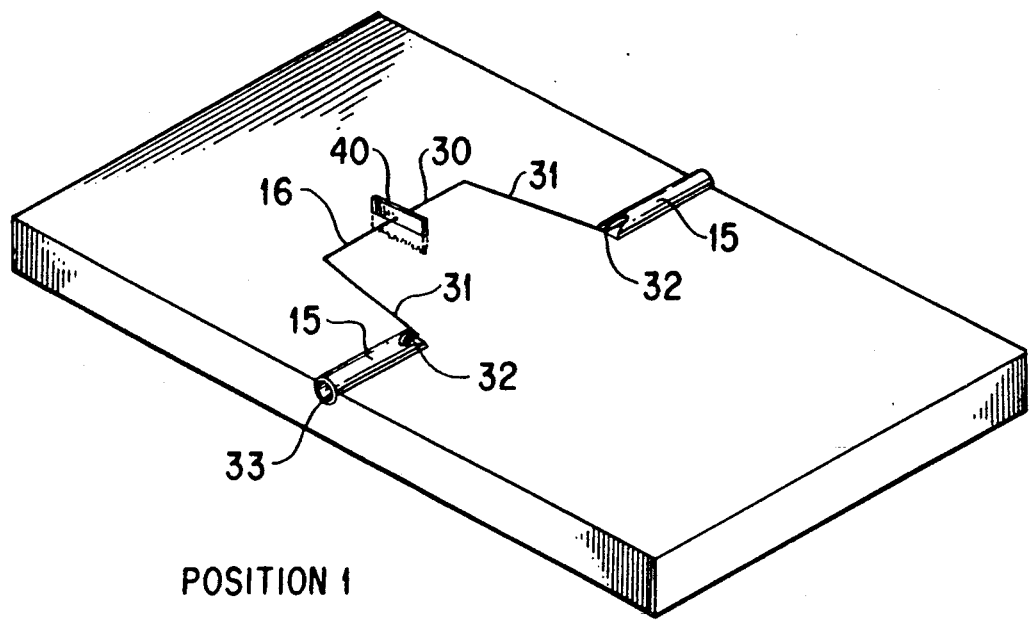
FIGS. 4a and 4b are a pair of isometric views of the rear or "non-contact" side of the embodiment of FIG. 3, showing both "loaded" and "secured" positions for a spring bar system which secures the modular panel to its adjacent structural members.
Figure 4B:
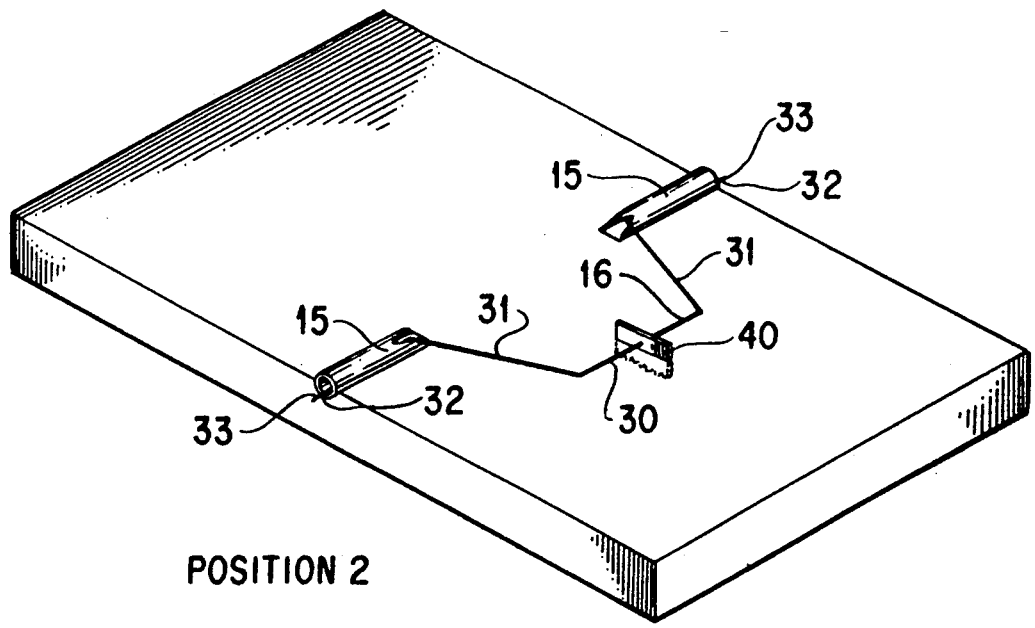
Figure 5A:
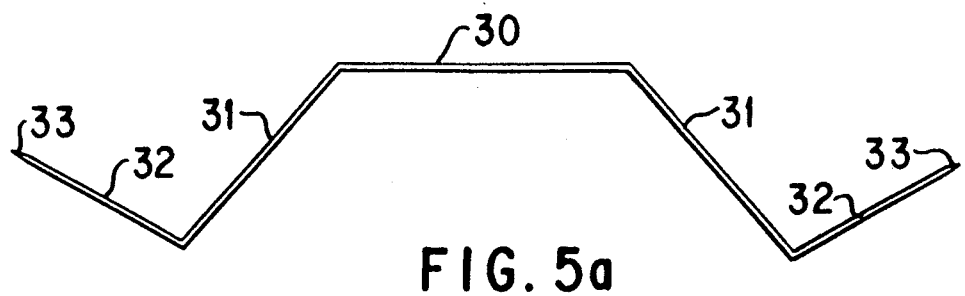
FIGS. 5a and 5b are front and end views of the spring bar from the securement system of FIG. 4 removed from the panel.
Figure 5B:
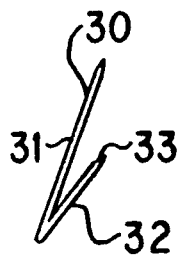

FIGS. 4a and 4b show the rear side of one panel with one spring bar 16 installed in both loaded and secured positions. Bar 16 is preferably constructed of round spring steel of diameter between 0.08" and 0.15". As illustrated in FIGS. 5a and 5b, four bends are made in a straight bar to separate outward oriented segments 32 with pointed ends 33, symmetrically-opposed angled segments 31, and center handle segment 30. The center handle segment 30 is oriented perpendicular to the longitudinal length of panel 10. End segments 32 terminate in the sharpened points 33 and are designed to stab into wood framing members adjacent the panel. Bend angles of bar 16 are further discussed with reference to FIGS. 5a and 5b.

Outward end segments 32 of bar 16 are inserted into guide tubes 15 as further described with reference to FIGS. 4a, 4b, 5a and 5b. Guide tubes 15 are provided to allow spring bar rotation without damaging insulation board 11, and are recessed and adhered into insulation board 11 as further described with reference to FIG. 7. Retainer 40 is a rectangle of sharp-edged rigid sheet material with a boared hole for sliding the rectangle onto spring bar 16. The retainer is rotatably mounted on the handle segment 30 of spring bar 16. The sharp edge of rectangle 40 may be punched into insulation board 11 to securely hold bar 16 in either loaded (FIG. 4a) or sprung (FIG. 4b) position.

In the loaded position (FIG. 4a), angled segments 31 of bar 16 are restrained by guide tubes 15 so that the pointed ends 33 of the bar segments 32 do not protrude beyond the edges of panel 10. To secure panel 10 in place, rectangle 40 is pulled out of insulation board 11 and spring bar 16 is rotated 180 degrees, pivoting about segments 32 in guide tubes 15. After partial rotation of about 45°, pointed ends 33 spring out past the panel edges and into adjacent framing members. As rotation continues, spring force is applied by bar 16 to hold panel 10 against the back side of surface 22 in FIGS. 2 and 3. When handle segment 30 of bar 16 approaches panel 10, the sharp edge of rectangle 40 is again pushed into insulation board 11 to secure spring bar 16 and maintain the applied spring force. Further details on spring bar 16 and guide tube 15 are provided in FIGS. 5-7.

FIG. 5a shows spring bar 16 in its rest position. As previously described with reference to FIG. 4a, bar 16 has two bends distinguishing symmetrically-angled segments 31 from center handle segment 30, and two additional bends distinguishing end segments 32 from angled segments 31. Segments 32 terminate with sharpened points 33. The total width of bar 16 between sharpened tips 33 is approximately 3" wider than panel 10 in an unstressed condition. Segments 32 angle toward imaginary extensions of handle segment 30, so that inward forces applied to angled segments 31 reduce the bar width between points 33 and bring segments 32 closer to parallel alignment with handle 30.

Figure 10:
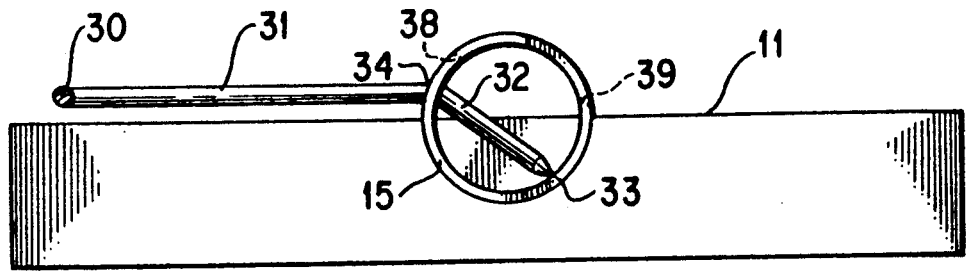
FIG. 10 is an end view of the spring bar of FIGS. 5a and 5b within the guide tube of FIGS. 6a and 6b.

As shown in the end view of FIG. 5b, bar 16 is able to apply a torsional spring holding force between panel 10 and surface 22 (FIG. 3) because its five segments do not lie in the same plane. Segments 30 and 31 do lie in a common plane, but segments 32 are bent symmetrically out of the plane of segments 30 and 31 to form non-planar segments. In a preferred design placed with handle 30 and pointed ends 33 on a supporting plane, the intersections of segments 31 and 32 will symmetrically rise approximately ¾" above the supporting plane (as shown in FIG. 10). Suitable dimensions for spring bar 16 when panel 10 has 14" width are approximately 3" for handle 30, 5" for angled segments 31, and 3" for non-planar segments 32.

Figure 6A:
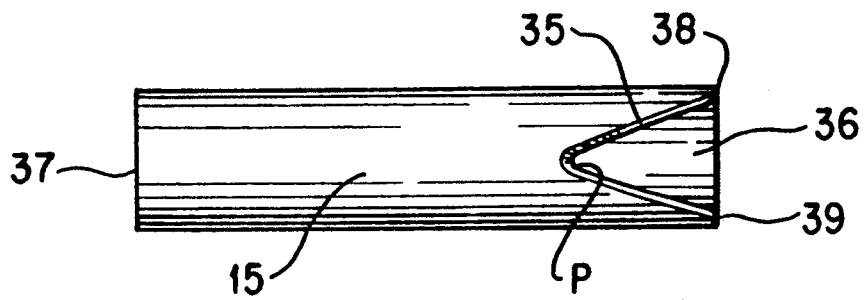
FIGS. 6a and 6b are top and side views of one spring bar guide tube from the securement system of FIG. 4.
Figure 6B:
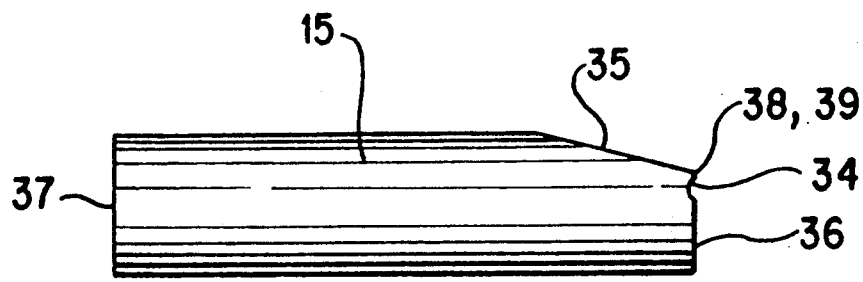

FIGS. 6a and 6b show in more detail a preferred embodiment for guide tubes 15. The guide tubes 15 may be made from any suitable material and be of any size sufficient to support and retain the spring bar without inhibiting its movement through the tube or breaking the tube under the load of the spring bar. Preferably, the guide tubes 15 comprise a section of pipe with an angled cut 35 across one end of the tube as shown to define two converging edges intersecting at a recess end P. The cut 35 provides a channel for the spring bar to travel upon 45° rotation to allow the spring bar to expand upon entry into the recess end P of the cut 35 which allows the pointed ends 33 to extend past the confines of the width of the panel and the guide tube. When in the loaded position (FIG. 4a), segments 31 of bar 16 are compressed inward from an unstressed original bar length and retain a spring force trying to return the bar 16 to its unstressed condition. The segments 31 press against a first tube end surface 38. While moving to the secured position (FIG. 4b), segments 31 of bar 16 rotate against the first tube end surface 38 until reaching the beginning of cut 35 where the spring force overcomes the force holding the bar 16 in a compressed condition and bar 16 exerts its internal spring force outward forcing the bar 16 along a converging edge toward end P (which functions as a penetration surface), wherein ends 33 of the bar 16 protrude past the confines of guide tube 15 and penetrate into and are retained within adjacent penetrable framing members 21. Upon additional rotation of the bar 16, ends 33 remain penetrated in framing members 21 while segment 31 extends over the opposite converging edge of the cut 35. This rotation and the angling of the end segments 32 out of the plane of the handle and angle segments 30,31 (as shown in FIGS. 5a, 5b and 10) creates a spring force as segments 32, angled (in a direction defined by ends 33) toward room surface 20 in the loaded position, now attempt to angle away from room surface 20 after the 180° rotation of bar 16. The spring force normal to surface 20 is created because the penetration of ends 33 into framing members 21 prevents movement of segments 32 away from room surface 20.

The guide tubes of a preferred embodiment are made as follows. Straight sections of thin wall nominal ½" PVC tube having 0.840" outside diameter are cut into 3.25" lengths with ends 36 and 37 perpendicular to the tube axis. An additional angled cut is made to generate converging edges removing approximately 140 degrees of the 360 degree circumference of end 36 to form the cut 35. A suitable angle between cut 35 and the tube axis is approximately 17 degrees. Angled cut 35 meets end 36 at end surfaces 38 and 39. A notch 34 is located in end surface 38 and will be described in conjunction with FIG. 7.

Figure 7:
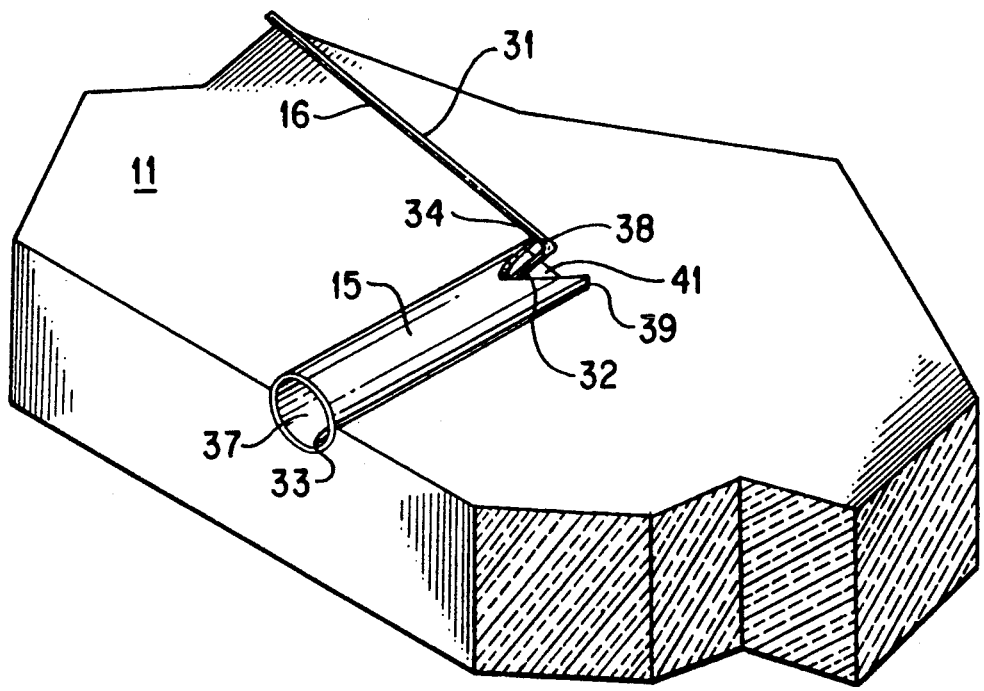
FIG. 7 is a close-up isometric view showing additional detail for the securement system of FIG. 4.

FIG. 7 is an enlarged isometric view of one end of spring bar 16 installed in the loaded position as previously shown in FIG. 4a. Guide tube 15 is secured into prepared cylindrical groove 41 of panel 11 so that the axis of tube 15 is approximately in the plane of the outer surface of panel 11 and perpendicular to the panel length. Tube 15 is positioned in cylindrical groove 41 with the intersection of end surface 39 and cut 35 in the plane of the outer panel surface of panel 11 and the intersection of end surface 38 and cut 35 projecting above the outer panel surface. Spring bar 16 is compressed so that ends 33 may be inserted, one at a time, into guide tubes 15 at each edge of the panel. Pointed spring bar ends 33 are inserted into the tubes through the openings formed by angled cuts 35. After insertion, bar 16 is placed in the loaded position so that the portion of segment 31 nearest its intersection with segment 32 is restrained in the small notch 34 adjacent the end surface 38 at the tube end 36. The end surface 38 thus serves as a loading surface for the spring bar. Segments 32 of spring bars 16 are slightly shorter than tubes 15, so that ends 33 do not project beyond tube edge 37 in the loaded position. With the bars 16 restrained in notches 34 of tubes 15, bar sections 30 and 31 lie flat against the outer surface of panel 11.

When spring bar 16 is in the loaded position, sharp ends 33 are forced against the inner surfaces of tubes 15 by the non-planar segments 32 and lie beneath the outer panel surface of panel 11 by an angle rotated toward center of panel 11 from the axis of tube 15 along edge 37 (see FIG. 10). The preferred angle is approximately 45 degrees. As spring bar 16 is rotated, bar segments 31 snap free from notches 34 on both sides. Since bar 16 must rotate approximately 45 degrees to snap free, ends 33 spring outward from a point nearest room surface 20 within tubes 15 to thereby maximize spring deflection and holding force in the secured position.

Rotation to the 45° position places the angled segment 31 of the spring bar 16 at the penetration surface P between the converging edges of the cut 35. This position permits elastic expansion of the spring bar for penetration of the pointed ends 33 into the framing members. Continued rotation of the spring bar to the 180° position (the secured or sprung position) causes the angled segments 31 to extend over the opposite converging edge of the cut 35 (i.e., the securing surface) and allows the spring force generated in the spring bar 16 by the nonplanar segments 32 to urge the panel towards the room surface 20 to place as much as possible of the metal surface 14 in contact with the room surface material 22.

Figure 8:
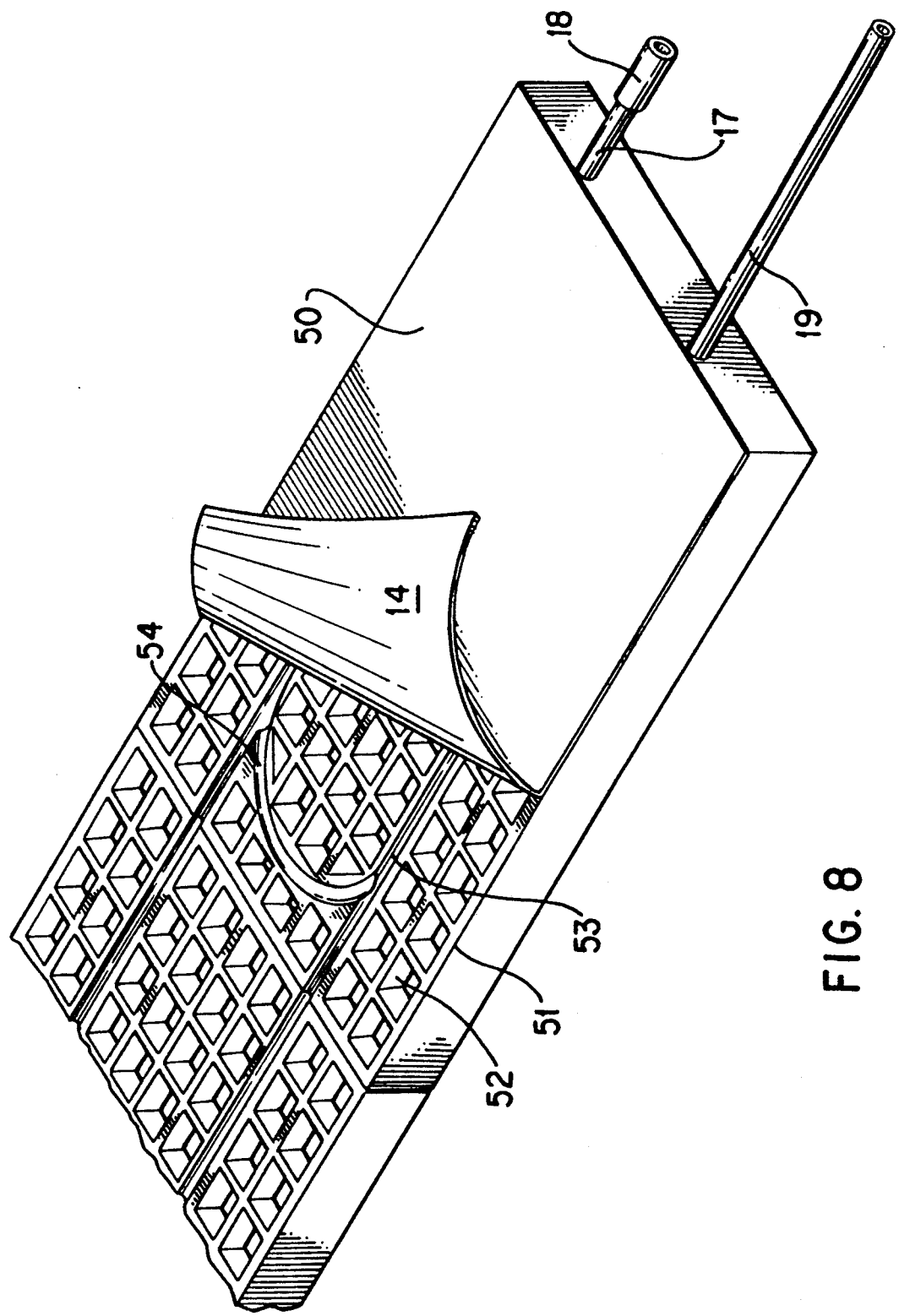
FIG. 8 is a partially cut isometric view showing the "contact" side of a second modular panel embodiment before installation.
Figure 9:
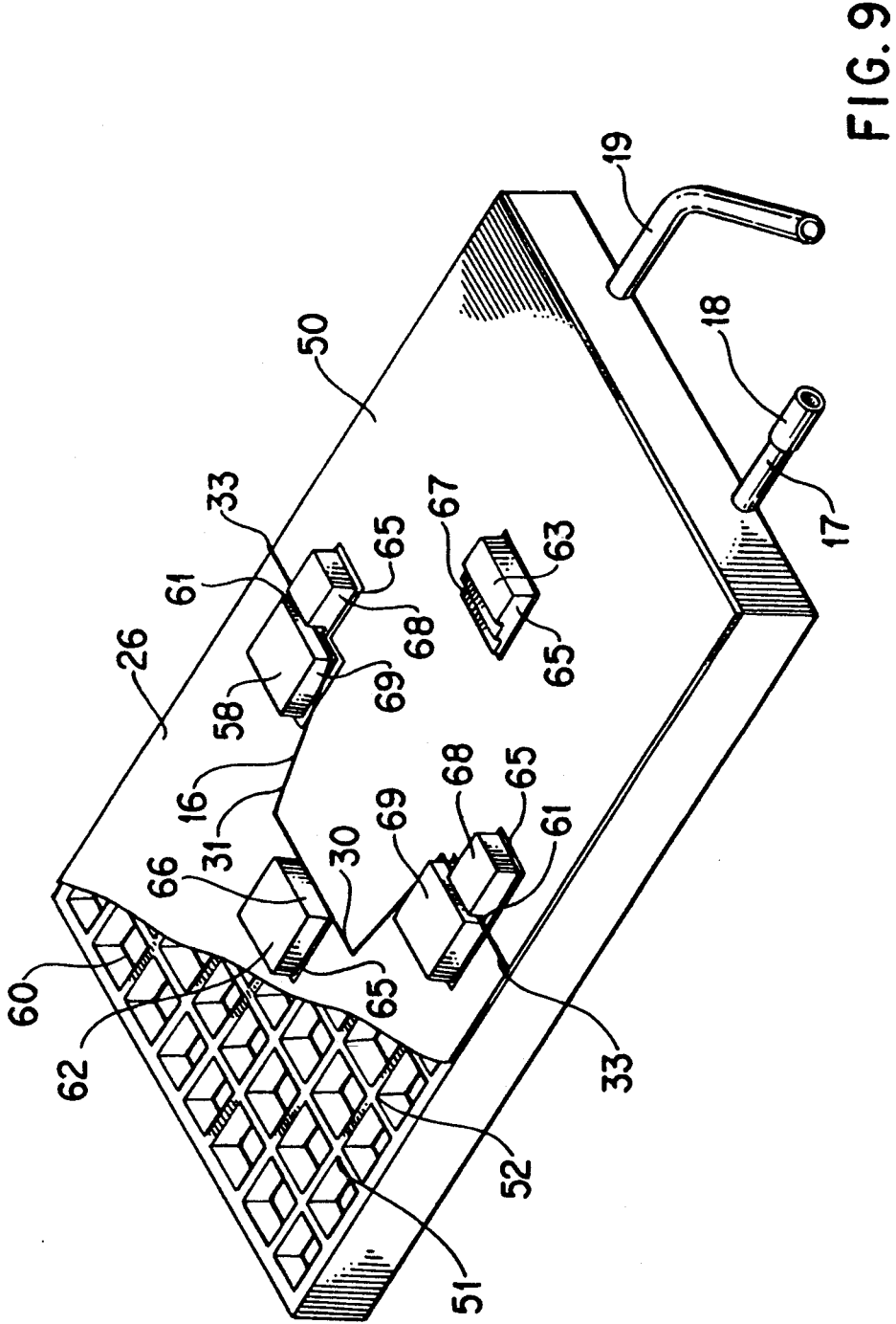
FIG. 9 is a partially cut isometric view showing the "non-contact" side of the second modular panel embodiment.

FIGS. 8 and 9 show layered isometric views of contact and rear sides, respectively of an alternate panel design with molded "waffle" insulating core. As shown in FIG. 8, modular cores 51 of expanded polystyrene beads or other moldable insulating material are produced in lengths of approximately 2 feet and joined end-to-end to generate a range of finished panel lengths on 2 foot increments. Various interlocking end features may be used, but a simple vertical joint between abutting molded panels is preferred since most panel adhesives are stronger than moldable insulating materials, and assembly jigs can eliminate the need for integrated locators.

FIG. 8 shows the contact side of waffle panel 50 with surface foil 14 peeled back to expose the features of molded core 51. Cores 51 are molded with full length straight channels 53 and return bend channels 54 allowing each core to be used for any panel segment. Molded channels 53 and 54 are narrower by approximately 0.05" than the outer tube or cable diameter to securely hold tube 12 or alternate electric heating cable. Channels 53 and 54 are approximately 0.05" deeper than the heating element diameter or depth, to accommodate the oval shape of resilient tube or cable shapes when squeezed by the channel walls.

Visible features of panel 50 are similar to those of solid foam core panel 10 described with reference to FIG. 1. One significant feature of molded core 51 is its waffled surface configuration. Recessed cavity 52 is one cavity in the regular grid pattern on both sides of core 51. The waffled design reduces core material cost and allows the concealed side of surface foil 14 to serve an insulating function by resisting radiant heat transfer across cavities 52. When the cavities are less than 1.00" deep, thermal resistance of the cavity airspace with reflective foil isolating the cavity will approximately equal the thermal resistance of an equivalent thickness of molded bead polystyrene foam. In a preferred configuration with core 51 2" thick, waffle cavities 52 extend inward from both sides of core 51 to a center separation plane of solid molded material 0.25" thick. Opposed cavities 52 are then 0.875" deep. Cavity width and length may vary with configurational requirements, but should not exceed about 2" in either direction to maintain panel strength and foil support.

FIG. 9 shows the non-contact side of waffle core panel 50 with surface foil 26 peeled back to expose core 51. Waffle cavities 52 are opposed to identical cavities on the contact side, except at locations opposite the tube groove, where non-contact side cavities are wider than contact side cavities. Optionally, solid foam strips (not shown) may oppose tube channels which are not required on the non-contact side. While the waffle core panel may use similar spring bar holding features to those previously described, FIG. 9 also shows alternate molded retainers for spring bar 16 shown in the loaded position. Raised blocks 58 are molded integrally with waffle core 51 and have slots 61 transverse to the panel length to hold segments 32 of spring bar 16. Openings 65 are cut in surface foil 26 to allow blocks to extend above the plane of the foil. In the loaded position, an additional raised integral block 62 holds segment 30 of bar 16 by friction fit, with segments 31 of bar 16 also held by friction fit against faces 69 (loading surfaces) of raised blocks 58. When panel 50 is placed in position, segment 30 of bar 16 is forcibly rotated about segments 32 in slots 61, freeing bar segment 30 from its friction fit against block 62.

As rotation proceeds, bar segments 31 are also freed from their friction fit against loading surfaces 69 of blocks 58, allowing pointed ends 33 to spring outward into adjacent framing members. Penetration surfaces 68 of blocks 58 establish maximum outward movement of bar ends 33 as bar rotation continues. When 180 degree rotation is nearly completed, bar segment 30 contacts stepped face 67 of raised block 63 integral with molded core 51. Since the position of segment 30 along the panel length will vary slightly due to variable outward movement of points 33 as affected by framing member spacing and pointed end penetration depth, face 67 is stepped to be closest to block 62 where block 63 rises from the plane of panel 50 defined by foil surface 26.

An alternate design using the molded insulating core would maintain a planar surface for contacting the room surface rear side, but with back side panel surfaces tapered from lines of maximum core thickness at the tube or cable locations to lines of minimum thickness at the longitudinal panel center and edges. This alternate design could provide more efficient use of the core material from both structural and thermal standpoints, but would complicate rear side foil placement and panel handling.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Various changes may be made by those skilled in the art without departing from the spirit of the invention.

We claim:

1. A modular temperature controlling panel for location adjacent a rear side of a room surface and between spaced penetrable structural framing members for supporting said room surface, said panel comprising:
   an insulating core having a contact surface for location adjacent said room surface and a non-contact surface opposite said room surface;
   a linear thermal source recessed within said core on said contact surface;
   a metallic sheet on the contact surface of said core for contacting said linear thermal source; and of said core for securing said core between said spaced framing members and for urging said contact surface towards said room surface, said spring retention means being rotatable about a rotation axis perpendicular to said framing members between a loaded position for confining said spring retention means within said core and a secured position for biasing said spring retention member to penetrate said spaced framing members and urge said contact face of said core towards said room surface.

2. The panel of claim 1, wherein said spring retention means comprises:

an elastic spring bar having ends for penetrating said spaced framing members, said ends being located on outward segments of said spring bar non-planar from remaining segments of said spring bar; and a pair of guide tubes for each end of said spring bar, said tubes being secured to said non-contact surface and aligned along said rotation axis, each guide tube being located adjacent one framing member and including a loading surface for confining the corresponding end of said spring bar within said tube and a penetration surface for allowing said spring bar to elastically expand to urge the end to penetrate said framing member.

3. The panel of claim 2, wherein said penetration surface is defined by an angled cut across said tube.

4. The panel of claim 2, wherein said loading surface includes a notch for retaining said spring bar in said loaded position.

5. The modular panel of claim 2, wherein said spring bar comprises a handle segment centrally located on a length of said bar, symmetrically-opposed angled segments integral and immediately adjacent to said center handle segment, and outward oriented non-planar segments integral and immediately adjacent said angled segments and having ends for penetrating said framing members.

6. The modular panel of claim 1, wherein said spring retention means includes a holder attached to said retention means for releasably lockably engaging said core to hold said retention means in said loaded position and said secured position.

7. The modular panel of claim 1, wherein said linear thermal source comprises at least an inlet and an outlet end, at least one of said ends being of a length sufficient to connect with adjacent thermal source ends on adjacent panels.

8. The modular panel of claim 1, wherein said thermal linear source comprises two ends emerging from said core on a same longitudinal end of said insulating core, said thermal linear source forming a U-bend adjacent an opposite longitudinal end of said insulating core.

9. The modular panel of claim 1, wherein said metallic sheet is coated with a surface to maximize heat transfer at portions not in direct contact with said rear side of said room surface.

10. The modular panel of claim 9, wherein said coated surface comprises black paint.

11. The modular panel of claim 1, further comprising at least one heat spreading fin disposed under and adjacent to said linear thermal source and located between said insulating core and said metallic sheet to aid in heat transfer from said linear source to said rear side of said room surface.

12. The modular panel of claim 1, further comprising a reflective surface located immediately on said non-contact surface to reduce heat loss through said non-contact surface of said core.

13. The panel of claim 1, wherein said spring retention means comprises:

a spring bar having ends for penetrating said spaced framing members, said ends being located in outward segments of said spring bar non-planar relative to remaining segments of said spring bar; and a pair of blocks for each end of said spring bar, said blocks being located on said non-contact surface and aligned along said rotation axis, each block being located adjacent a framing member and including a loading surface for confining said end of said spring bar within said core and a penetration surface for allowing said spring bar to elastically expand to urge said end to penetrate said framing member.

14. The panel of claim 13, wherein said blocks are integral with said insulating core.

15. The panel of claim 1, wherein said insulating core includes a plurality of recessed cavities arranged in a grid pattern in said contact and non-contact surfaces of said core, and a separating layer separating said cavities in the contact surface from communication with said cavities in said non-contact surface.

16. A modular temperature controlling panel for location adjacent a rear side of a room surface and between spaced penetrable structural framing members for supporting said room surface, said panel comprising:

an insulating core having a contact surface for location adjacent said room surface and a non-contact surface opposite said contact surface;

a linear thermal source recessed within said core on said contact surface;

a metallic sheet on said contact surface of said core for contacting said linear thermal source;

a plurality of recessed cavities arranged in a grid pattern in the contact and non-contact surfaces of said core, said plurality of recessed cavities in said contact surface being separated from the plurality of recessed cavities in the non-contact surface by a separation layer; and a spring retention means on said non-contact surface of said core for securing said core between said spaced framing members and for urging said contact surface toward said room surface, said spring retention means being rotatable about a rotation axis perpendicular to said framing members between a loaded position for confining said spring retention means within said core and a secured position for biasing said spring retention means to penetrate said spaced framing members and urge said contact surface of said core toward said room surface.

17. The panel of claim 16, wherein said insulating core comprises a plurality of interconnected core elements, the length of said panel varying directly with an increasing number of core elements.

18. The panel of claim 16, wherein said spring retention means comprises:

a spring bar having ends for penetrating said spaced framing members, said ends being located in outward segments of said spring bar non-planar relative to remaining segments of said spring bar; and a pair of blocks for each end of said spring bar, said blocks being located on said non-contact surface and aligned along said rotation axis, each block being located adjacent a framing member and including a loading surface for confining said end of said spring bar within said core and a penetration surface for allowing said spring bar to elastically expand to urge said end to penetrate said framing member.

19. The panel of claim 18, wherein said blocks are integral with said insulating core.

* * * * *